Patented Nov. 22, 1932

1,888,415

UNITED STATES PATENT OFFICE

THEODORE L. SWENSON, OF BETHESDA, MARYLAND, DEDICATED TO THE FREE USE OF THE PUBLIC

PROCESS FOR THE PRESERVATION OF EGGS

No Drawing.   Application filed January 21, 1932.   Serial No. 587,970.

(GRANTED UNDER THE ACT OF MARCH 3, 1883, AS AMENDED APRIL 30, 1928; 370 O. G. 757)

This application is in part a continuation of my application bearing Serial No. 455,951, filed May 26, 1930.

This application is made under the act of March 3, 1883, as amended by the act of April 30, 1928, and the invention herein described, if patented, may be manufactured and used by or for the Government for governmental purposes without payment to me of any royalty thereon.

I hereby dedicate the invention herein described to the free use of the public, to take effect upon the granting of a patent to me.

This invention relates to the preservation of eggs. Shrinkage of eggs due to a loss of moisture and the loss of carbon dioxide is one of the most important factors causing deterioration of eggs in cold storage.

I provide an efficient and effective means of protecting shell eggs by dipping or immersing the eggs in an oil sealing or preserving material, such as a mineral or other oil, vegetable gum, etc., subjecting the eggs to a vacuum which is released by carbon dioxide gas, thereby replacing whatever carbon dioxide gas may have been lost from the eggs and obtaining a maximum liquid penetration and seal which will retard the loss of moisture and carbon dioxide gas.

In carrying out my process eggs are placed in a suitable container or carrier which is in turn placed within a chamber containing mineral oil or other sealing material, capable of being hermetically sealed and the eggs are then submerged in the oil or other sealing material. The chamber is then closed in an air tight manner and the eggs, oil and chamber are evacuated. When the proper vacuum is obtained the eggs are raised above the surface of the oil, each egg shell being covered with a thin film of oil. Experimentation has shown that a vacuum of 20 inches gives the greatest efficiency in the process. The vacuum is then released with carbon dioxide gas which is partially dissolved and carried into the egg shells and membranes. That gas which is not dissolved is carried into the egg as free carbon dioxide gas. This leaves a partially dry surface on each egg and does effectually protect the eggs against slow deteriorative quality changes.

Evacuation of the eggs under oil is an essential feature of the method. The carbon dioxide gas which is drawn from the eggs while the pressure is decreased in the chamber is taken up or dissolved in the mineral oil, thus avoiding the actual loss of gas.

I have found that analysis of egg shells and egg membranes which have been subjected to my process show a marked increase in liquid absorption over egg shells and membranes dipped at ordinary atmospheric pressures. Experiments conducted in connection with eggs preserved in accordance with this process disclose that such eggs have a marked tendency to retain their original quality to a far greater degree than eggs preserved by other known processes.

Having fully disclosed my discovery I claim as my invention:

1. A process of preserving eggs, which comprises immersing the eggs in a mineral oil in a chamber capable of being evacuated, followed by evacuating said eggs, oil and chamber and then raising the said eggs above the surface of the oil, after which the vacuum previously created is released by introducing carbon dioxide gas into the vacuum chamber.

2. A process of preserving eggs which comprises immersing the eggs in a sealing material in a chamber capable of being evacuated, followed by evacuating said eggs, oil and chamber and then raising the said eggs above the surface of the sealing material, after which the vacuum previously created is released by introducing carbon dioxide gas into the vacuum chamber.

THEODORE L. SWENSON.